INVENTOR
GENUNG L. CLAPPER
BY Paul M. Brame
AGENT

United States Patent Office 3,533,072
Patented Oct. 6, 1970

3,533,072
ADAPTIVE LOGIC SYSTEM UTILIZING MODIFICATION OF OUTPUT FEEDBACK IN CONDITIONING CONTROL LOOP
Genung L. Clapper, Raleigh, N.C., assignor to International Business Machines Corporation, Armonk, N.Y., a corporation of New York
Filed July 17, 1967, Ser. No. 653,889
Int. Cl. G05b 13/00
U.S. Cl. 340—172.5    7 Claims

ABSTRACT OF THE DISCLOSURE

An adaptive logic system having a plurality of adaptive memory units conditioned by the provision of input signals as well as conditioning signals, until the desired outputs are obtained, and including means for modifying the output feedback signals in the conditioning control loop for the adaptive memory.

BACKGROUND OF THE INVENTION

This invention relates to adaptive logic systems and particularly to an adaptive logic system in which the signals fed back to the adaptive memory units in the system via the conditioning circuitry are modified by control means to provide different sets of responses other than those which normally occur when the output feedback in the conditioning control loop is responsive to the disparity between the condition of the adaptive memory units and a desired state.

In prior adaptive logic systems there are usually found a large number of multistate memory units and the system configuration is such that a learning or training cycle is employed to condition the system to respond to given inputs with desired outputs. The system initially may have a null or inchoate response and at the start of the training or conditioning cycle the memory units comprising the system may be in such a number of states so that the system itself is in the null condition or any of a number of random conditions depending on the setting of the memory units.

During training, successive inputs are supplied to the system and the desired outputs are also supplied to the system. Suitable means detects the disparity, if any, between the input and the output and acts in the direction to correct the disparity. The inputs are again presented, and disparities between input and output are successively corrected. Such training cycles or conditioning runs, as they may be called, are repeated until the system clearly distinguishes, without error, each set of input information which is to provide a given output.

Normally the conditioning is permitted to take its natural course by allowing the outputs of the adaptive memory units to generate output signals which are fed back via conditioning circuitry to cause the adaptive memory units in conjunction with the required inputs to move to that condtion required by the output during the training. However, it has been discovered that the learning process may be enhanced if the conditioning feedback signals which are fed back in the conditioning control loops are effectively modified from their normal response during the training cycle.

Moreover, it has been found to be advantageous to restore adaptive memories to a neutral state before actual conditioning begins. This is especially true for magnetic adaptive memory units which are subject to saturation effects. A previous training experience may cause excessive accumulation of weights in certain units which may then experience considerable difficulty in adjusting to the requirements of the new conditioning sequence. When all units have been brought to a "don't know" or neutral state, the subsequent conditioning time is greatly shortened.

SUMMARY OF THE INVENTION

Briefly described, this invention contemplates an adaptive logic system in which suitable input signals are supplied to a plurality of adaptive memory units, the number being determined by the total number of inputs and the number of desired output conditions which are to be indicated. These adaptive memory units constitute multistable devices which have a null or neutral state from which they may be conditioned to one or more active states on each side or in either direction from the null or neutral condition or state. Such displacement or conditioning causes the adaptive memory unit to supply, on an associated set of output lines, voltages which indicate the degree to which the memory unit has been conditioned from one side or the other of its neutral state. Equal outputs indicate that the unit is in the neutral state.

All of these outputs from the bank of memory units common to a particular output condition are supplied via a pair of common output lines to a balance decision unit which is arranged and constructed in such manner that it provides a ternary output indicative of the balance of outputs on the two weighted output lines. That is, both outputs will be provided if both of the weighed output lines are equal in their weight; that is to say, the voltage thereon. If the output lines are not so balanced, the balance decision unit will provide an output which indicates the direction of unbalance. The feedback in the conditioning control loop is normally provided by feeding back outputs from the balance decision units via conditioning circuitry to the adaptive memory units with appropriate reversal of connection so that departure from a given output conditions the memory toward that output. The present invention specifically provides means for modifying the output conditions via the feedback loop and the conditioning circuitry to provide improved conditioning of the adaptive memory units. A first embodiment provides a neutralization arrangement which in effect provides a "don't know" state for the outputs of the memory units. A second embodiment provides an arrangement where the memory units are effectively rewarded for proper conditioning by providing a signal which is the inverse of the correction signal that has been used in the past.

Accordingly, it is an object of this invention to provide an improved adaptive logic system in which the conditioning operation is effectively changed by varying the conditions in the feedback loop which provides feedback from the output to the conditioning circuits of the adaptive memory system.

Another object of the invention is to provide an adaptive logic system in which the learning process is enhanced by varying the output feedback in the conditioning control loop of the adaptive memory units employed in the system.

Still another object of the invention is to provide an improved adaptive logic system in which the normal conditioning feedback may be changed to provide a means for "neutralizing" the states of the memory units to overcome saturation effects.

A further object of the invention is to provide an improved adaptive logic system in which the normal learning process may be varied to include a condition wherein the operation of the memory units are effectively rewarded by providing a signal which is the inverse of the normal correction signal used in such a system.

The foregoing and other objects, features and advantages of the invention will be apparent from the following more particular description of two preferred embodiments of the invention as illustrated in the accompanying drawings.

BRIEF DESCRIPTION OF THE DRAWINGS

Similar reference characters refer to similar parts in each of the two views.

DESCRIPTION OF THE PREFERRED EMBODIMENT

Figure 1:
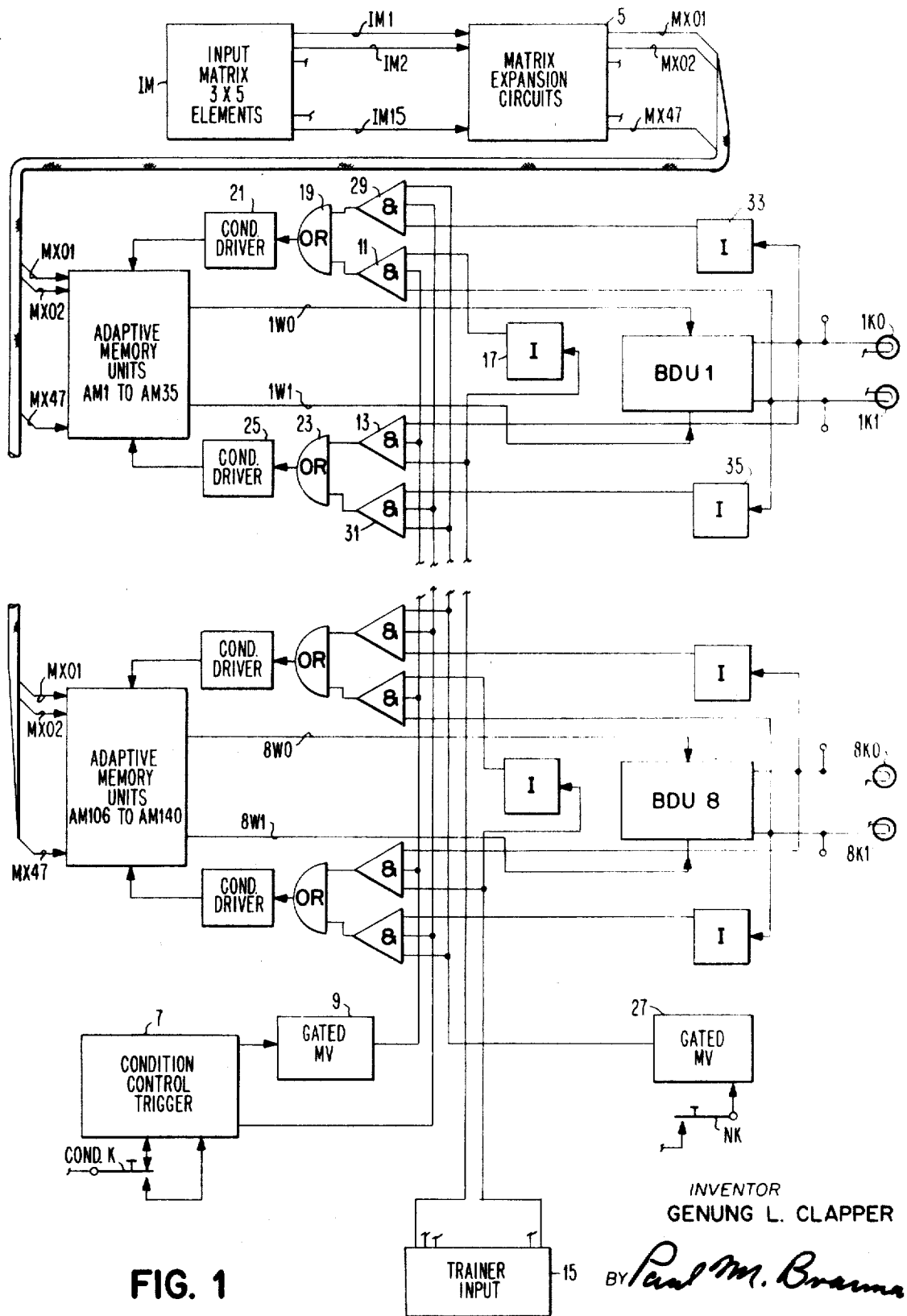
FIG. 1 is a diagrammatic view showing an adaptive logic system utilizing a first preferred embodiment of the invention in which the conditioning feedback is provided with a neutralization feature.

Referring now to FIG. 1 of the drawings, the input to the system is derived from an input matrix IM which may have, for example, 15 elements arranged in rows of 3 and columns of 5, from which 15 output lines such as the lines IM1, IM2 through IM15 are supplied, these lines having signals thereon when the associated one of the elements in the input matrix is active. These input lines are connected to the matrix expansion circuits 5, in which output signals are derived for the various combinations of input signals supplied thereto. One exemplary arrangement of such matrix expansion circuits is shown in U.S. Pat. 3,317,900. The expanded or transformed outputs are designated by coded numbers, three of which are indicated as MX01, MX02, and MX47.

The expanded outputs are supplied in parallel to a plurality of banks of adaptive memory units, only two such banks being shown in the drawing, the remainder being arranged in identical fashion. One such bank of adaptive memory units is provided for each output condition which is to be indicated, and each of the banks contains a number of adaptive memory units equal to the number of inputs supplied thereto from the matrix expansion circuits. For example, the first bank of adaptive memory units contains adaptive memory units AM1 through AM35. The intervening two banks of adaptive memory units for the second and fourth orders of binary output are not shown; but the last bank, which would be for the binary order of 8, will contain the adaptive memory units AM106 to AM140. As can be seen from the drawings, the inputs are supplied in parallel to each of these banks of memory units. Each memory unit in the bank may be of the type described in U.S. Pat. 3,286,103, for example. It is sufficient to point out for the purposes of the present invention that the memory unit, upon the supply thereto of suitable input and conditioning pulses, will provide an output on one or the other or both of the pair of output lines depending upon whether or not the conditioning signals are such as to cause the memory unit to be displaced from one side or the other of a neutral condition or state.

The outputs from each of the adaptive memory units are supplied to a set of common output lines associated with the particular memory bank, such as the lines 1W1 and 1W0 associated with the first memory bank, and lines 8W1 and 8W0 associated with the last memory bank. The voltages on these output lines will be balanced or equal or will be unbalanced in accordance with the condition of the input activated memory units in the memory banks to which they are connected. Thus the condition of the adaptive memory units is reflected in the balanced or unbalanced condition of the voltages on the output signal lines from the particular memory bank whenever an input pattern is presented. The outputs on the common output lines from the memory banks are supplied to a balance decision unit, one for each memory bank, such as the units designated BDU1 and BDU8. These balance decision units are sensitive voltage comparison devices which monitor the condition of the voltage on the common output lines supplied thereto and provide output signals indicative of the balance or the unbalance of the voltages on these lines. For example, if the balance output line 1W0 has a slightly higher voltage than the line 1W1, then an output signal is supplied from the balance decision unit to indicator lamp 1K0 and the output terminal associated with lamp 1K0 indicating that the zero condition is present for the output of the first memory bank. Conversely, if line 1W1 has a higher voltage than 1W0, the indication lamp 1K1 will be lighted, and the associated output terminal is energized. In the event that the line voltages are balanced or nearly so, within the tolerance of the balance decision unit, output signals are present on both the outputs from the balance decision unit and therefore, both output indicator lamps 1K0 and 1K1 will be illuminated and both of the output terminals will be energized.

The output terminals may be connected to other units not shown, including decoding and utilization devices for utilizing the information supplied from the adaptive memory system. Since the ultimate use of the information stored by the system is not germane to the structure and operation of the present invention, these further details have not been shown.

In order to condition the adaptive memory units, signals from a trainer input are supplied both in normal and inverted form to the adaptive memory banks via associated AND circuits and condition driver circuits. In addition to the trainer inputs, the logic circuits supplying control signals to the conditioning drivers are supplied with inputs from the opposing output line of the balance decision unit as well as an input from a conditioning key control trigger which serves to render the conditioning circuits active only when desired. Moreover, when the conditioning circuits are inactive, an input from a gated multivibrator under the control of a neutralization key NK can be supplied to the conditioning driver circuits in the manner to be subsequently explained.

In normal operation, the trainer inputs are set for the desired output with a given input. If the balance decision unit does not put out a signal of suitable value, the output signal on the output line from the balance decision unit is fed back in combination with the input from the trainer input and a series of pulses from a gated multivibrator controlled by the condition control trigger. The condition driver is thereby energized to drive all of the memory units in the banks to thereby further condition the adaptive memory units which have inputs supplied thereto under the given conditions, to increase or decrease their weight as necessary. After the adaptive memory units have been suitably trained, it is then possible to present various input combinations thereto and have the adaptive memory units supply appropriate outputs to the output circuits that cause the desired output to be produced.

In the first preferred embodiment of the invention as illustrated by FIG. 1, the neutralization input acts to eliminate spurious input/output responses by forcing the output to the indeterminate or "don't know" state. The manner in which the system operates to provide such neutralization will be illustrated by describing the operation of the adaptive memory unit bank including units AM1 to AM35, it being understood that operation of all the remaining banks in the system would be similar.

In the normal conditioning operation, the conditioning key COND K when operated sets the condition control trigger 7 to its ON state. In this condition it supplies a control signal to gated multivibrator 9, which operates to supply a series of appropriately spaced pulses to the logic circuits associated with the adaptive memory unit conditioning circuitry. In the present instance, the conditioning pulses supplied to the first memory bank are supplied as one input to a pair of AND circuits designated by reference characters 11 and 13. The other inputs to AND circuit 11 include a connection from the output of balance decision unit BDU1 indicating a binary output value of 1, and connected to the indicator lamp 1K1, as well as an output from the trainer input 15 supplied through an inverter 17. The output of AND circuit 11 is supplied to one input of an OR circuit 19, the output of which is supplied to the condition driver 21, this particular condition driver being effective to condition the adaptive memory units in the first memory bank to a binary zero condition, to thereby move the output signals from the adaptive memory units in the direction to cause the output line 1W0 to have a greater output voltage thereon than the line 1W1 and thereby to produce a binary zero output at the output of the balance decision unit BDU1.

The other inputs to the AND circuit 13 comprise a connection from the binary zero output of unit BDU1 and a direct input from the trainer input 15. The output of AND circuit 13 is supplied to one input of OR circuit 23, which governs condition driver 25, this condition driver being connected to the adaptive memory units AM1 through AM35 to drive those units having inputs supplied thereto in the direction to increase the signal on the output line 01W1.

The foregoing circuitry is that which is involved in the normal conditioning of the system and is representative of the arrangements used in the prior art. In operation, with the desired trainer output set up, for example with the trainer input circuits set to provide a signal for a 1 output, and with pulses being supplied from the gated multivibrator 9 as a result of condition control trigger 7 being set, if the balance decision unit BDU1 provides an output on the line associated with indicator 1K0, then conditions will be met to provide an input to each of the three inputs of AND circuit 13. The output signal from AND circuit 13 is supplied through the OR circuit 23 to enable the condition driver 25, which in turn supplies signals to the adaptive memory units in the first bank which have inputs supplied thereto, to condition these units to the point where the voltage on output line 1W1 is greater than that on line 1W0. This condition persists until the output on the line to indicator 1K0 from balance decision unit BDU1 decreases to thereby cut off one input to AND circuit 13 whereupon the conditioning will be complete. Conversely, if the trainer input circuits 15 are not supplying an output for the binary 1 output conditions, then a signal will be supplied from the trainer input circuit via inverter 17 to one input of AND circuit 11; the other input from gated multivibrator 9 will be periodically energized; and with a signal on the line to indicator 1K1, an output will be provided from AND circuit 11 through OR circuit 19 to enable condition driver 21, which thereupon supplies conditioning pulses to the adaptive memory units in the first band to cause the output signals to be unbalanced in the direction such that the line 1W0 has a voltage thereon greater than that on line 1W1. When this fact is indicated by the output of the balance decision unit BDU1, the signal on the line to indicator 1K1 will disappear, thereby disabling the AND circuit 11 and causing the conditioning to cease. All of the foregoing operation is in accordance with the normal conditioning of a system of this type.

Now considering the additional apparatus and the manner of operation in accordance with the first embodiment of the invention, another set of inputs is provided to the conditioning loop from a gated multivibrator 27 which is adapted to be energized by operation of a neutralizing key NK, so that when neutralizing key NK is operated, a plurality of pulses are supplied from the gated multivibrator to logic circuits such as the one input of the AND circuits 29 and 31 associated with the first memory bank. Another input is supplied to each of AND circuits 29 and 31 from the "off" side of the condition control trigger 7, thereby indicating that the normal conditioning operation is not in progress. The third input to AND circuits 29 and 31 are from the outputs of inverters 33 and 35, respectively, the inputs of which are connected to the output lines to indicators 1K0 and 1K1, respectively.

With these connections, the regular conditioning control is ineffective and the conditioning drivers are controlled by the pulses supplied from the neutralization gated multivibrator 27, which are effective to control the condition drivers in such manner that the outputs of the balance decision units, being supplied through the inverters 33 and 35, will control the condition drivers so that they drive adaptive memory units in the associated memory bank to a balanced condition wherein the output signals on the output lines 1W0 and 1W1 are equal, at which time the output signals to the indicators 1K0 and 1K1 will also be in a neutral condition thereby cutting off the outputs to both the inverters 33 and 35 with the result that the neutralizing operation is halted. Thus if a zero output condition is to be neutralized, the inverted output supplied through the inverter 33 cuts off the AND circuit 29; and the inverted output on the line to indicator 1K1 from the output of inverter 35 enables the AND circuit 31, so that the pulses from the neutralizing multivibrator are effective to control conditioning driver 25, thereby causing all activated memory units, that is the ones to which an input is being supplied, to move toward a state in which the output on line 1W1 is equal to that on line 1W0. Under this condition, with both outputs now present, the inverted outputs are both cut off, stopping the neutralizing process. This arrangement can be used to bring all of the adaptive memory units in a bank to a zero or null state by energizing the input lines to the adaptive memory units in succession and repeating the neutralizing operation so that all of the memory units are eventually brought to the null state in their turn. Thus it can be seen that the use of the neutralization circuits will allow a particular output bank in the adaptive memory system to be conditioned to a neutral or "don't know" state in response to a particular set of inputs by causing the neutralization operation to be applied while the particular inputs are being supplied to the adaptative memory units in the bank.

Figure 2:
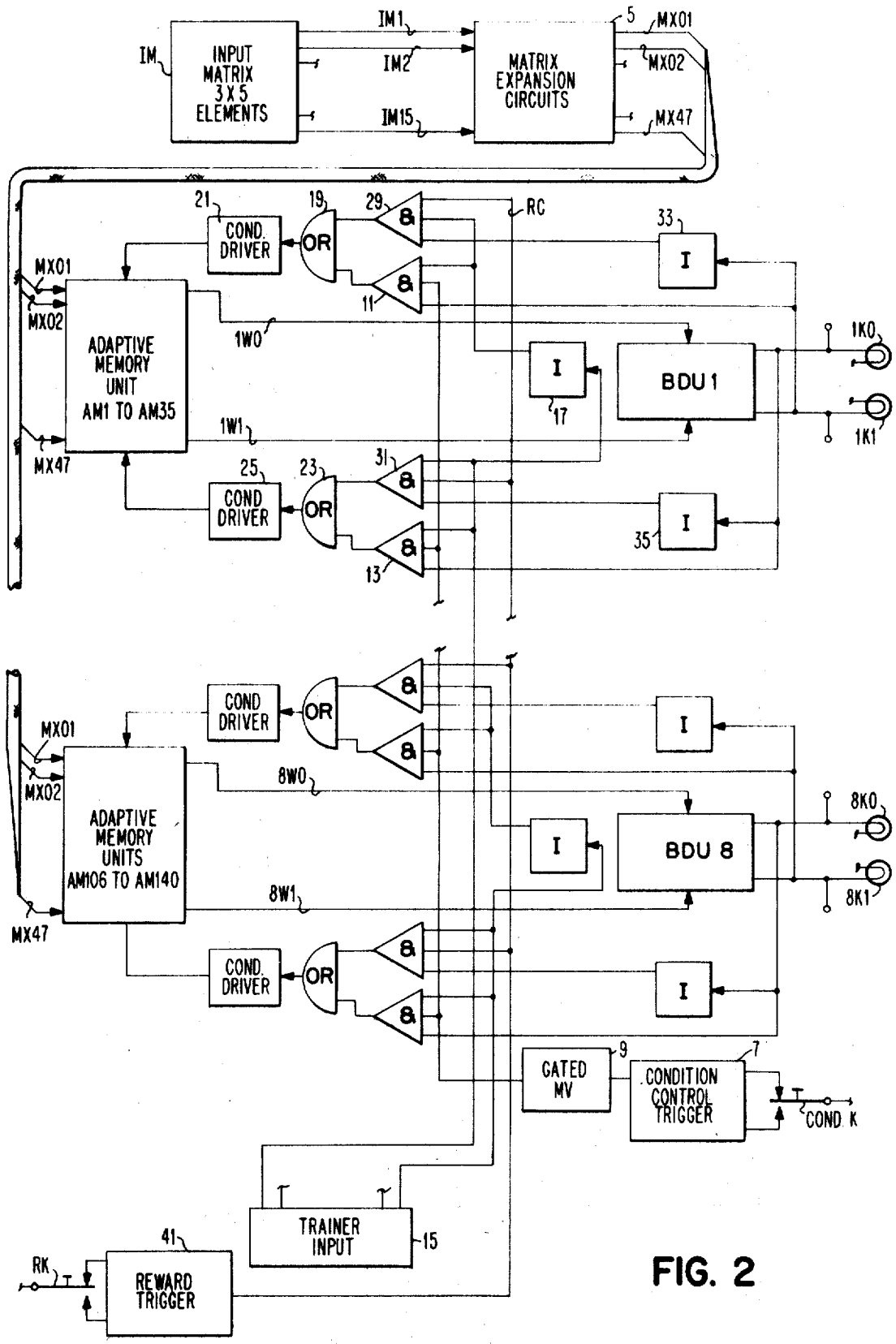
FIG. 2 is a diagrammatic view of an adaptive logic system incorporating a second preferred embodiment of the present invention in which the conditioning feedback loops are provided with a "reward" feature.

Considering now the second embodiment of the present invention, as illustrated diagrammatically in FIG. 2 of the drawings, it will be apparent from a mere inspection of the drawings that the general configuration of the system is similar to that shown in FIG. 1 and described hereinbefore. Also the operation of the system is essentially the same as that described in connection with FIG. 1 for normal conditioning operations. The connections for the conditioning control trigger and its associated gated multivibrator 9 are essentially identical with those described in connection with FIG. 1, i.e., they provide for energizing the AND circuits 11 and 13 for the normal conditioning, to energize the conditioning drivers 21 and 25 to condition the memory banks to the state determined by the opposite output signal lines from the balance decision unit BDU1, in conjunction with appropriate inputs from the trainer input 15, either directly to the one input of AND circuit 13 or via inverter 17 to the input of AND circuit 11. Under normal conditions, accordingly, the apparatus shown in FIG. 2 operates to condition the system in the same manner as the arrangement shown in FIG. 1. However, the embodiment disclosed in FIG. 2 includes a reward feature, including a reward trigger 41 governed by a reward key RK, such that when the key RK is pressed, a signal is supplied on a reward control line RC, which provides one input to AND circuits such as 29 and 31 associated with the first memory bank. The other inputs to AND circuit 29 include an output from the inverted trainer input line from the inverter 17, and an output from the inverter 33 connected to the output line of the balance decision unit BDU1 which governs the indicator 1K1.

For AND circuit 31, the two additional inputs include the direct trainer input line from the trainer input 15 and the output of inverter 35, which is governed by the signal on the output from balance decision unit BDU1 that controls the binary indication 1K0.

It can be considered for the purpose of understanding the operation of the equipment that the "reward" circuits are in parallel with the usual "correction" circuits that are used to add weight when the output is not correct. For example, for rewarding with an increase in the binary zero valve weight, the inverse of the binary 1 output is combined with the inverse of the desired output and with the "reward" control by the AND circuit 29. The inverse output functions are used to distinguish against a "don't know" condition. With the apparatus arranged as shown in FIG. 2, conditioning can now take place in two steps. First, all correct orders can be rewarded with a unit of weight and, second, all incorrect orders may be corrected with as many units as necessary to bring a correct answer. The reward and correction operations are mutually exclusive since the "reward" uses the inverse of the output and the "correction" uses the direct output. However, if correction is done first, all orders will be correct and then all can be rewarded equally. Accordingly, the sequence of operation is important in determining the learning procedure. Regardless of which procedure is used it is possible by utilization of the arrangement in the feedback loops as shown in FIG. 2 to increment all the weights that are correct and so build up the weights in unique descriptors. This is not possible with the usual error correcting methods. A system utilizing the "reward" operation as well as the "correct" operation can improve the speed with which the system learns and also provides more tolerance on the unwanted or "noise" input patterns which will be characteristic of real life signals supplied to the inputs of the system.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An adaptive logic system comprising, in combination,
a plurality of adaptive memory units, each unit capable of being conditioned to selected ones of a plurality of stable states in accordance with input and conditioning signals supplied thereto,
input signal means for supplying input signals to said memory units,
conditioning signal means connected to said memory memory units for supplying conditioning signals to said memory units,
first conditioning control means connected to the output of said adaptive memory units and to said conditioning signal means for governing said conditioning signal means in accordance with the output of said adaptive memory units to condition said adaptive memory units in a corrective direction to displace said units from the output condition which renders said first conditioning control means effective,
and second conditioning control means connected to the output of said adaptive memory units and to said conditioning signal means for governing said conditioning signal means in accordance with the output of said adaptive memory units to condition said adaptive memory units in a direction opposite to said corrective direction.

2. An adaptive logic system comprising, in combination,
a plurality of metastable adaptive memory units,
input signal means for supplying input signals to said memory units,
conditioning means connected to said memory units to condition the units to predetermined conditions in accordance with said input signals and in accordance with desired outputs,
first conditioning control means connected to said memory units and to said conditioning means to control the conditioning of said memory units in accordance with the outputs from said memory units, and
second conditioning means connected to said memory units and to said conditioning means to control the conditioning of said memory units in accordance with inverse outputs from said memory units.

3. An adaptive logic system comprising, in combination,
a plurality of metastable memory units, each unit having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;
input means connected to said memory units for setting said units in selected conditions;
a pair of memory output signal lines connected to the output circuits of all of said memory units;
balance decision means connected to said output signal lines and responsive to signals on said lines to provide a first output when the signals on said memory lines are equal, a second output when the signals on said memory output lines are unbalanced in a first relation, and a third output when the signals on said memory output lines are unbalanced in a second relation;
first conditioning means connected to said memory units and to said balance decision means for controlling the conditioning of said memory units to selected conditions in response to input signals, said conditioning means being controlled by said balance decision means to condition said memory units in a direction to displace said units from the condition indicated by said balance detection unit; and
second conditioning means connected to said memory units and to said balance decision means for controlling the conditioning of said memory units to selected conditions in response to input signals, said conditioning means being controlled by said balance decision means to condition said memory units in a direction to displace said units to a neutral condition in which the signals on said memory output lines are equal.

4. An adaptive logic system as claimed in claim 3, further including means for disabling said second conditioning means when said first conditioning means is effective.

5. An adaptive logic system as claimed in claim 3, further including training means connected to said first conditioning means for conditioning said memory units to provide selected outputs for specified input conditions.

6. An adaptive logic system comprising, in combination,
a plurality of metastable memory units, each unit having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;
input means connected to said memory units for setting said units in selected conditions;
a pair of memory output signal lines connected to the output circuits of all of said memory units;
balance decision means connected to said output signal lines and responsive to signals on said lines to provide a first output when the signals on said memory lines are equal, a second output when the signals on said memory output lines are unbalanced in a first relation, and a third output when the signals on said memory output lines are unbalanced in a second relation;

first conditioning means connected to said memory units and to said balance decision means for controlling the conditioning of said memory units to selected conditions in response to input signals, said conditioning means being controlled by said balance decision means to condition said memory units in a direction to displace said units from the condition indicated by said balance detection unit; and second conditioning means connected to said memory units and to said balance decision means for controlling the conditioning of said memory units to selected conditions in response to input signals, said conditioning means being controlled by said balance decision means to condition said memory units in a direction to displace said units further and in the same direction from the condition and direction indicated by said balance detection unit.

7. A adaptive logic system as claimed in claim 6, further including training means connected to said first conditioning means for conditioning said memory units to provide selected outputs for specified input conditions.

References Cited

UNITED STATES PATENTS

| | | | |
|---|---|---|---|
| 3,284,780 | 11/1966 | Clapper | 340—172.5 |
| 3,317,900 | 5/1967 | Clapper | 340—172.5 |
| 3,317,901 | 5/1967 | Clapper | 340—172.5 |
| 3,333,249 | 7/1967 | Clapper | 340—172.5 |

RAULFE B. ZACHE, Primary Examiner